Figure 1:
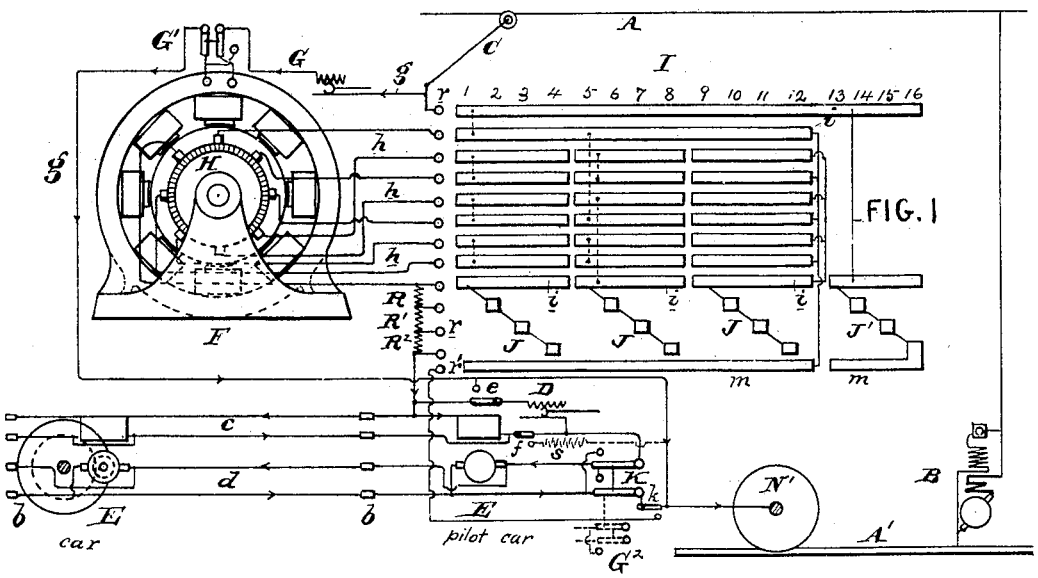

(No Model.)

R. M. HUNTER.
CONTROLLING DEVICE FOR ELECTRIC RAILWAYS.

No. 595,570. Patented Dec. 14, 1897.

Attest
Wm. L. Evans
R. M. Kelly

Inventor

UNITED STATES PATENT OFFICE.

RUDOLPH M. HUNTER, OF PHILADELPHIA, PENNSYLVANIA.

CONTROLLING DEVICE FOR ELECTRIC RAILWAYS.

SPECIFICATION forming part of Letters Patent No. 595,570, dated December 14, 1897.

Application filed October 12, 1897. Serial No. 654,937. (No model.)

*To all whom it may concern:*

Be it known that I, RUDOLPH M. HUNTER, of the city and county of Philadelphia and State of Pennsylvania, have invented an Improvement in Controlling Devices for Electric Railways, &c., of which the following is a specification.

My invention has reference to controlling devices for electric railways, &c.; and it consists of certain improvements which are fully set forth in the following specification and shown in the accompanying drawings, which form a part thereof.

This application, Case No. 298, has special reference to controlling devices for electric circuits conveying continuous currents of constant potential, and more especially adapted for electric-railway work where it is essential to control the current delivered to the motors of one or more cars to vary their speed and power.

In my Patent No. 385,055, of 1888, I employ a system of regulation comprehending the coupling of the motors of a car in series or parallel and thereby varying the internal resistance as well as the counter electromotive forces. This system dispensed with the necessity of large external rheostats and other wasteful means. This same general principle is further set out in my Letters Patent Nos. 494,705 and 500,132, of 1893, in all of which the main regulation is due to the employment of the counter electromotive forces of the power-motors themselves. In the application of these systems to surface steam road when changed to employ electric power great difficulties present themselves, arising from the fact that when a number of car equipments are joined into a train they must all be controlled from the front of the train. In this case it is seen that there may be a constantly-varying number of motors on a train to control, and they must be all controlled simultaneously and from the front of the train. It is impracticable to use the present wiring such as employed in street-car practice, and consequently the series-multiple method of utilizing the counter electromotive forces of the power-motors of the cars cannot be utilized. In my present improvements I provide each car with one or more electric motors and motor-circuits terminating in couplings at each end, so as to be electrically connected with the similar conductors on the next car. No regulators proper are on the passenger-cars, but, instead, the forward part of the train is provided with what may be termed a "pilot-car," upon which is arranged the necessary controlling devices for simultaneously regulating the current to all of the motors of the train. The regulator on the pilot-car is preferably a counter-electromotive-force generator whose counter electromotive force is made greater or less to oppose the initial electromotive force to a varying degree, according to the current desired to flow to the motors. In this manner, while it is not convenient to use the counter electromotive force of the motors as the means for varying the speed, the same advantages may be secured.

In carrying out my invention I cause the current from the collector or source of energy to pass through the regulator, thence through all of the field-magnets of the motors, thence back to the pilot-car and through one part of a reversing-switch, thence back through the armatures of all the motors on the cars, and finally returned to the other part of the reversing-switch on the pilot-car and to ground or the source of energy once more. The armature-circuits I provide with a current-reversing switch to enable the current in the armatures to be reversed relatively to that in the fields to cause the motors to reverse, but it is evident that the reversing-switch might just as well have been employed in the field-circuits. The regulator consists of two parts—namely, a counter-electromotive-force generator and hand-switch devices for varying the counter electromotive force at will and, if desired, for combining it with temporary resistances to produce more gradual changes of speed. In the preferred form of my regulator I employ an armature rotating in a multiple field and in which the armature is formed of a series of separate windings in which are generated separate counter electromotive forces. These separate counter electromotive forces may be coupled in series, series multiple, or multiple and employed with or without additional resistances by the hand-switch.

Other types of counter-electromotive-force generators may be used in lieu of that shown—as, for example, any of those disclosed in my Patent No. 592,225, dated October 19, 1897, and with which my improved hand-controlled switch may be combined.

My improvements may also be employed to brake or arrest the momentum of the train by first converting the regulator and motors into generators when the speed is high and opposing an electromotive force to that of the line, and when the speed is low to cause the motors to act as generators to produce current to overcome the counter electromotive force of the regulator and the resistances under their various conditions of adjustment, as more fully set out hereinafter.

My invention will be better understood by reference to the accompanying drawings, in which—

Figure 2:
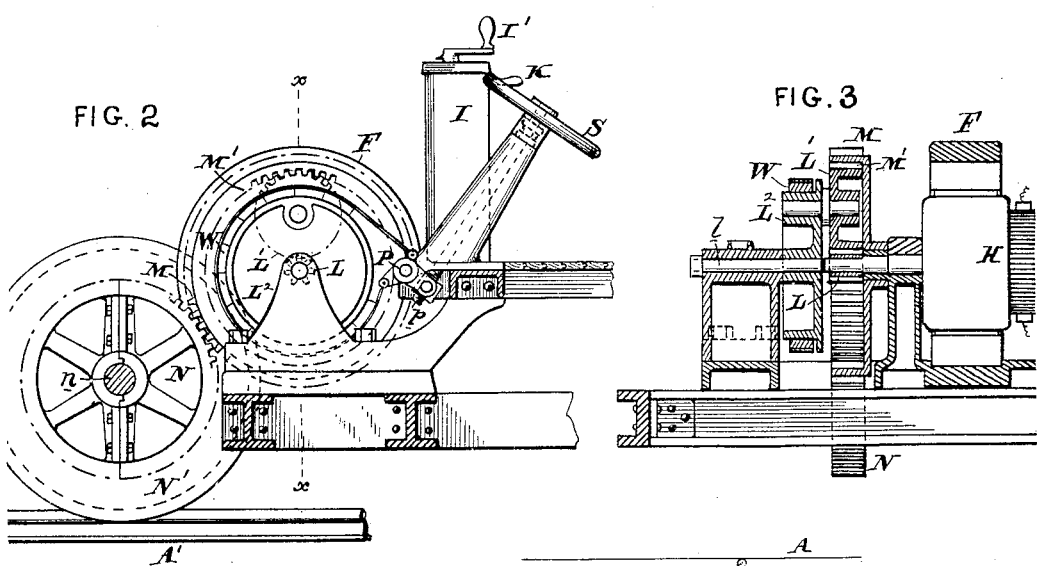
Figure 3:
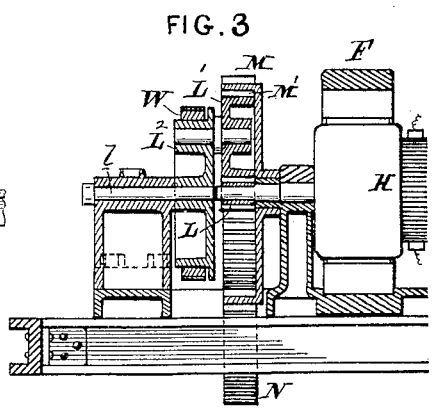
Figure 4:
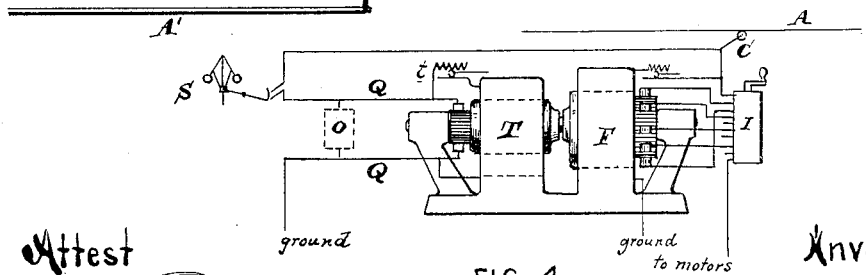

Figure 1 is a diagram illustrating the electric circuits and apparatus embodying my invention. Fig. 2 is a side elevation of my improved regulator adapted to a car. Fig. 3 is a cross-section of same on line $x$ $x$, and Fig. 4 is an elevation of a modified form of counter-electromotive-force generator.

A is the positive conductor, leading from a source of electric energy B and may be a trolley-wire or a third rail when applied to electric railways.

A' is the return-circuit and may be the rails.

C is the current-collecting device or trolley and may be of any desired construction and terminates in one of the contacts $r$ of the hand-switch I.

F is the counter-electromotive-force generator, and comprises a multiple field with a revolving armature H, having a multiple winding, so that each set of coils produces its own counter electromotive force. As shown, four such windings are indicated. Hence these counter electromotive forces may be coupled in series, series multiple, or multiple by a simple movement of the hand-switch I. The brushes from the commutator connect by circuits $h$ with the contacts $r$. The barrel of the switch I has the contacts $i$ J formed thereon, as indicated in Fig. 1, of which $i$ controls the coupling up of the counter electromotive forces and J the cutting in or out of the temporary resistances R R' R². By turning the handle I' of the switch I the positions 1 to 4 connect the windings of the regulator, so that the several counter electromotive forces are in series, and with the resistances gradually cut out. The positions 5 to 8 couple the counter electromotive forces in pairs and the pairs in series, making a series-multiple connection, and likewise the resistances R R' R² are successively cut out. The positions 9 to 12 couple the counter electromotive forces in parallel and similarly cut the resistances R R' R² out. The positions 13 to 16 cut the counter-electromotive-force generator F out of circuit and rely on the resistances R R' R² and the counter electromotive force of the motors E alone. This is for very high speeds. The positions 1 to 4 are for slow speeds, 5 to 8 for medium speeds, and 9 to 16 for high speeds. In all there are fifteen speeds possible by simply moving the handle I' of the switch. In running for any length of time the positions 4, 8, 12, and 16 are alone used to avoid losses in the rheostats.

The fields and the regulator F are supplied with current by a shunt-circuit $g$, provided with a rheostat G, and preferably a reversing-switch G', so as to enable the fields to be reversed in polarity relatively to the armature. In some cases this reversing-switch G' will not be necessary. Its use only occurs when the armature H is geared to the axle of the pilot-car, as shown, for example, in Figs. 2 and 3. Even in this case the lead may be changed and the switch dispensed with, or the reversing-switch may be in the armature-circuits, as is well known. It is simply necessary to provide means for reversing the rotation of the armature and generate a counter electromotive force, as in the case of any motor. When the regulator rotates independent of the direction of rotation of the axles, as in Fig. 4, this switch is not necessay.

It is evident that the counter electromotive force may be further changed or modified through the rheostat G by varying the strength of the field-magnets. The use of this rheostat will enable the counter electromotive force for a given speed of armature rotation to be varied or adjusted to suit the current duty, according as the train is made up of few or many cars and motors. Thus if the train has but few cars the counter electromotive force must be relatively high, and in this case the field strength of the regulator is made high but when the number of motors to be controlled is large, the strength of the field-magnets is made low. This gives to the regulator as a whole a very large capacity, capable of adjusting itself to all possible requirements and duties. After making up a train and adjusting the field-rheostat G to what is necessary to control the slow speed it may be left in such adjustment and all future regulation be carried on by the hand-switch I.

E E represent electric motors on the cars and adapted to propel them. They may be geared to the axles in any suitable or well-known manner.

$c$ are the field-circuits, and $d$ the armature-circuits, extending along the cars from end to end. The corresponding circuits on adjacent cars may be electrically connected by suitable couplings $b$. It will be observed that I have shown the field-magnets all coupled in parallel and all the armatures likewise coupled in parallel and the armatures in series with the fields, as this is the preferred way of coupling them, since the motors then will all act as series motors and the armatures may be reversed relatively to the fields by a single switch K on the pilot-car. For traction-work a series motor is found far superior to a shunt-motor on account of the variable duty and speeds required and its ability to produce great torque at starting. However, for use in cases other than traction I may employ shunt-motors.

N' represents the wheel of the pilot-car, and the switch K is grounded through it to rails, as shown. Where it is desired to supply more current to the armatures of the motors E than would be delivered by the fields, the rheostat D may be employed to shunt the required current around the field-magnets; but where the excess of current is required in the field-magnets then the switch $e$ is thrown up and the rheostat D used to shunt off part of the current which has passed through the field-magnets and before reaching the armatures. This will give a capacity for varying the torque of the motors and their counter electromotive force from the pilot-car and may be used in cases of very heavy grades, where with a high speed a large torque is required.

Any means desired may be employed to govern the speed of the armature; but for heavy trainwork I prefer to make the regulator perform work in propelling the train. In this manner the apparatus will be self-regulating once the train is under full headway, because if the train tends to increase its speed on a downgrade the counter electromotive force increases, and vice versa, acting to automatically cause the train to run at a uniform speed, the rate of which may be governed by the switch I, the rheostats G and D, or either of these.

I have shown in Figs. 2 and 3 one method of connecting the regulator F with the axle of the pilot-car. N is a gear on the axle $n$ and meshes with a large gear M, journaled as concentric to the shaft of the regulator F and having an internal gear M'. The shaft of the regulator is provided with a pinion L. A spur-wheel L' meshes with both the pinion L and internal gear M'. The spur-wheel L' is journaled on a shaft carried by a brake-band wheel $L^2$, journaled at $l$, concentric to and at one end of the regulator-shaft. A brake-band W encircles the wheel $L^2$ and is operated by a lever P, rocked by a screw $p$, and a hand-wheel S. By turning the hand-wheel the brake-band may be tightened or loosened on the wheel $L^2$. If the wheel $L^2$ is permitted to rotate freely, the car may remain at rest and the regulator generate its counter electromotive forces. By gradually applying the brake the wheel $L^2$ is made to rotate more slowly and the gear N correspondingly increases its speed. When the car is moving at its full speed, the brake is fully on and remains on during full speed.

If it is desired to employ the regulator and motors to arrest the momentum of the train and thus act as electric brakes, it is simply necessary to throw off the current and reverse the switches G' and K and then gradually turn the switch I again. The switch $k$ may then be thrown down to put contact $r'$ in circuit. This cuts the armature H and all of the motors E out of the line-circuit. We will then have the machines E and H acting as dynamos and in which H has its highest resistance and least torque. The current generated will further be caused to flow through all the resistances R R' $R^2$, which are gradually reduced until they are all cut out. This action is caused to take place by the contact-strip $m$ having been brought into operative condition with the contact $r'$. The positions 1 to 4 have the coils of armature H in series and hence condition of highest resistance and least current. When switch I is turned to positions 5 to 8, the series-parallel condition of the armature-coils is had and a lower resistance and greater current obtained, with consequent increased braking result. This action is further improved by turning the switch I to positions 9 to 12 and highest action secured when positions 13 to 15 are taken, as in that case the armature H is cut out and the motors E act as generators in parallel short circuits on the resistances R R' $R^2$, which are finally cut out. This operation has assumed the transformation of the machines F H into a generator, as well as the machines E; but it is evident that the braking action may be had while the machine F H is operated as a separately-excited motor. In this case the train operates the machines as generators and the current from them operates H as a motor. Under these conditions the coils of H are coupled in series, series multiple, and parallel by switch I as originally set out for regulation to vary the counter electromotive force and hence resistance to the current generated in machines E. To secure this end, the switch $k$ is dropped, as before, but the reversing-switch G' for the field F is not changed from the original position. This may be carried on until the positions 13 to 15 are reached, in which case the motors E, acting as generators, will be short-circuited through the resistances R R' $R^2$ alone, which may be gradually cut out. It will be observed in this case the motors E will be operating as series generators as in constant-current-circuit practice; but in this instance while they offer a great braking effect at high speeds they are adapted to soon lose their field strength and hence braking effect from the rapid drop of potential. On the other hand, this has an advantage in that the braking action decreases proportionally with the speed and ceases altogether when the train comes to a full stop. Instead of operating the motors as series-wound generators they may be transformed into separately-excited generators by simply providing the switch $f$ and rheostat $s$ (indicated in dotted lines) for throwing the field-coils into circuit with the line and ground. Under these conditions there is a gradual strengthening of the fields of the motors E when acting as generators proportionally with a slowing down of the armature speeds, which keeps up the electromotive force of the current flowing to make the final braking action more decided. Furthermore, it will be noticed that simultaneously with this action the resistance to the current generated in the armatures is reduced gradually by cutting out the resistances J', and hence the braking action is materially increased just before stopping, as it should be, so as to insure arresting the train at the precise point desired. With this improvement, as in the other, the electromotive force ceases when the train stops. Hence the stopping takes place positively, but without a perceptible jar. I prefer under this last operation of braking—namely, on positions 13, 14, 14, and 16 of switch I—to have the regulator F entirely out of circuit; but it is evident that it may be left in circuit and its electromotive forces used in conjunction with the resistances to vary the current flowing through either or both the fields and armatures.

It is evident that the resistance $s$ may be fixed or variable, as desired, and that the switches $k$ and $f$ may be operated with switch I, but I prefer in practice to arrange the devices which control the braking actions on a separate switch device from the speed-regulating device. It is also evident that by loosening the brake-band on the wheel $L^2$ the armature H may be operated as a motor whose speed is varied to suit the requirements to produce the requisite counter electromotive force. It will then not act as a generator, but only as a motor doing work of overcoming the friction of the brake-band, and its counter electromotive force is made available as the regulator of the work to be overcome by the current from the motors E acting as generators. In this case the switch I may or may not be moved, as desired.

While I have shown line-circuits A and A' with a dynamo-generator B as the source of electric energy, it is to be understood that storage batteries may be employed on or independent of the car, as will be readily understood by one skilled in the art.

In Figs. 2 and 3 I have shown the regulator F connected, so as to perform a duty to keep its speed within reasonable limits. Any other means for controlling the speed of the counter-electromotive-force generator may be employed—as, for example, any of the methods set out in my Patent No. 592,225, dated October 19, 1897, aforesaid. In Fig. 4 I have shown another example in which the regulator F is made to directly drive a generator T, forming in effect a motor-generator. As shown, the generator T is a shunt-wound machine and adapted to maintain a constant speed in the motor element F, which is also a shunt-wound machine. The duty may be varied by a rheostat $t$, which regulates the field of the generator T and thus controls the speed of the motor element F. The generator T may have its circuits Q connected with a resistance O, such as a storage battery, or arranged to charge the line. By proper winding for a minimum speed it will continually charge the line, since at no time will its potential fall below that of the line when the regulator is operating. If desired, a centrifugal governor-switch S may be employed in circuit Q to open the circuit the moment the potential of generator T falls to that in the line. Any other form of automatic switch may be used in place of the centrifugally-acting switch S.

Now while I have shown the counter-electromotive-force generator F arranged to a fixed or variable field to change the counter electromotive force of its armature it will be readily understood by one skilled in the art that the armature may be a simple armature with but two brushes and the field may be made to greatly vary in strength by interposing resistances, coupling the field-coils in series, series multiple, or multiple, or by changing the polarity or the ampere-turns in the field-circuit. In case where the generator is made with a multiple field and the area of polarity increased or decreased by changing the polarity of some of the field-poles a simple continuous armature-winding with a number of brushes is employed, which latter are thrown in or out of electrical circuit by a hand-switch to vary the points of commutation in varying the counter electromotive force available and desired.

I do not confine myself to the details herein set out nor to the use of my invention on railway-cars, as the details may be varied and the uses extended over those set out without departing from the spirit of my invention.

What I claim as new, and desire to secure by Letters Patent, is—

1. The combination of one or more electric motors, electric circuits leading from a source of electric energy and connecting with said motors for supplying current thereto, and a regulator in series with the motor or motors consisting of a counter-electromotive-force generator, comprising an armature revolving in fixed relation to field-magnets, one or more resistances, and a hand-switch for varying the counter electromotive force of the generator at intervals and then during the intervals inserting and removing from the circuit the said resistances while maintaining the counter electromotive force substantially constant.

2. The combination of one or more electric motors, electric circuits leading from a source of electric energy and connecting with said motors for supplying current thereto, a regulator in series with the motor or motors consisting of a counter-electromotive-force generator, one or more resistances, and a hand-switch for varying the counter electromotive force and inserting and removing from the circuit the said resistances, and means independent of said hand-switch for also varying the counter electromotive force.

3. The combination of one or more electric motors, electric circuits leading from a source of electric energy and connecting with said motors for supplying current thereto, a regulator in series with the motor or motors consisting of a counter-electromotive-force generator, one or more resistances, and a hand-switch for varying the counter electromotive force and inserting and removing from the circuit the said resistances, and a reversing-switch for simultaneously reversing one of the elements of all of the motors.

4. The combination of a motor-circuit containing a series of motors in parallel, means for simultaneously reversing one of the elements of each of the motors, a counter-electromotive-force generator interposed in the motor-circuit and comprising a series of separate coils moving in a magnetic field and in which are generated independent counter electromotive forces, a hand-controlled switch for coupling up the coils of the generator in series or parallel to vary the counter electromotive force, and means for varying the strength of the field of the counter-electromotive-force generator.

5. The combination of a motor-circuit containing a series of motors in parallel, means for simultaneously reversing one of the elements of each of the motors, a counter-electromotive-force generator interposed in the motor-circuit and comprising a series of separate coils moving in a magnetic field and in which are generated independent counter electromotive forces, a hand-controlled switch for coupling up the coils of the generator in series or parallel to vary the amount of counter electromotive force, and one or more resistances adapted to be put into and out of circuit with the motors and in series with the counter-electromotive-force generator.

6. The combination of a motor-circuit containing a series of motors in parallel, means for simultaneously reversing one of the elements of each of the motors, a counter-electromotive-force generator interposed in the motor-circuit and comprising a series of separate coils moving in a magnetic field and in which are generated independent counter electromotive forces, a hand-controlled switch for coupling up the coils of the generator in series or parallel to vary the amount of counter electromotive force, one or more resistances adapted to be put into and out of circuit with the motors and in series with the counter-electromotive-force generator, and means under the control of the hand-switch for inserting and removing the said resistances successively with each change in the counter electromotive force.

7. The combination of a motor-circuit, one or more motors supplied with current thereby, a counter-electromotive-force regulator in the motor-circuit, and a hand-switch for varying the counter electromotive force and also cutting it out of circuit by completing the motor-circuit around the counter-electromotive-force generator when generating a counter electromotive force.

8. The combination of a motor-circuit, one or more motors supplied with current thereby, a counter-electromotive-force regulator in the motor-circuit, a hand-switch for varying the counter electromotive force and also cutting it out of circuit by completing the motor-circuit around the counter-electromotive-force generator, and independent resistances adapted to be cut in and out in series with the motor both when the counter-electromotive-force generator is in and out of operative circuit with the motors.

9. A motor-circuit supplying current to one or more motors, a counter-electromotive-force generator consisting of an armature revolving in a magnetic field the said armature comprising separate windings, a hand-switch for connecting the separate windings of the armature in series or parallel, and means for varying the strength of the field in which the armature-windings revolve.

10. In an electric railway, the combination of one or more cars, electric circuits arranged thereon and extending end to end and terminating in couplings, one or more electric motors on said cars having the armatures and field-magnets connected in separate circuits, a pilot-car provided with a motor-circuit leading from a source of energy and connecting with the circuits on the cars, a counter-electromotive-force regulator comprising an armature having a series of windings moving in a magnetic field on the pilot-car, and a hand-switch for coupling up the separate windings of the armature of the counter-electromotive-force generator in series or parallel to vary the current supplied to the motors.

11. In an electric railway, the combination of one or more cars, electric circuits arranged thereon and extending end to end and terminating in couplings, one or more electric motors on said cars having the armatures and field-magnets connected in separate circuits, a pilot-car provided with a motor-circuit leading from a source of energy and connecting with the circuits on the cars, a counter-electromotive-force regulator comprising an armature having a series of windings moving in a magnetic field on the pilot-car, a hand-switch for coupling up the separate windings of the armature of the counter-electromotive-force generator in series or parallel to vary the currents supplied to the motors, and a reversing-switch upon the pilot-car for simultaneously reversing one of the elements of each of the motors on the cars.

12. In an electric railway, the combination of one or more cars, electric circuits arranged thereon and extending end to end and terminating in couplings, one or more electric motors on said cars having the armatures and field-magnets connected in separate circuits, a pilot-car provided with a motor-circuit leading from a source of energy and connecting with the circuits on the cars, a counter-electromotive-force regulator comprising an armature having a series of windings moving in a magnetic field on the pilot-car, one or more resistances on the pilot-car, and a hand-switch for coupling up the separate windings of the armature of the counter-electromotive-force generator in series or parallel and to cut in and out the said resistances with the several changes of the counter electromotive force to vary the currents supplied to the motors whereby a large variety of changes in speed is secured.

13. In an electric railway, the combination of one or more cars, electric circuits arranged thereon and extending end to end and terminating in couplings, one or more electric motors on said cars having the armatures and field-magnets connected in separate circuits, a pilot-car provided with a motor-circuit leading from a source of energy and connecting with the circuits on the cars, a counter-electromotive-force regulator comprising an armature having a series of windings moving in a magnetic field, a hand-switch on the pilot-car for coupling up the separate windings of the armature of the counter-electromotive-force generator in series or parallel and also to cut the counter-electromotive-force-generator windings out of operative electric circuit by completing the motor-circuit around them, finally to remove the resistances to the flow of the current through the motors after their speed has been attained, the whole operating to vary the currents supplied to the motors.

14. In an electric railway, the combination of one or more electric motors on a train supplied with current from a source of energy by a motor-circuit, a counter-electromotive-force generator arranged in the motor-circuit and consisting of field-magnets in which an armature revolves, hand-controlled devices for varying the counter electromotive force generated in the armature, and means to independently limit the speed of the armature.

15. In an electric railway, the combination of one or more electric motors on a train supplied with current from a source of energy by a motor-circuit, a counter-electromotive-force generator arranged in the motor-circuit and consisting of field-magnets in which an armature revolves, hand-controlled devices for varying the counter electromotive force generated in the armature, and means to limit the speed of the armature consisting of power-transmitting connections between the axle of the train and the shaft of the armature.

16. In an electric railway, the combination of one or more electric motors on a train supplied with current from a source of energy by a motor-circuit, a counter-electromotive-force generator arranged in the motor-circuit and consisting of field-magnets in which an armature revolves, hand-controlled devices for varying the counter electromotive force generated in the armature, means to limit the speed of the armature consisting of power-transmitting connections between the axle on the train and the shaft of the armature, and hand-controlled devices for governing said connection whereby the possible speed of the armature may be varied at will.

17. In an electric railway, the combination of one or more electric motors on a train supplied with current from a source of energy by a motor-circuit, a counter-electromotive-force generator arranged in the motor-circuit and consisting of field-magnets in which an armature revolves, hand-controlled devices for varying the counter electromotive force generated in the armature, means independent of the hand-controlled devices to limit the speed of the armature, and hand-controlled devices for controlling said means whereby the possible speed of the armature may be adjusted or varied.

18. In an electric railway, the combination of one or more electric motors on a train supplied with current from a source of energy by a motor-circuit, a counter-electromotive-force generator arranged in the motor-circuit and consisting of field-magnets in which an armature revolves, hand-controlled devices for varying the counter electromotive force generated in the armature, and means to limit the speed of the armature consisting of power-transmitting connections between the axle on the train and the shaft of the armature, and means for causing said armature-shaft to revolve independently of the power-transmitting connection with the axle of the train.

19. In an electric railway, a car provided with one or more electric motors, a motor-circuit connecting the motors with the source of electric energy, a counter-electromotive-force generator consisting of field-magnets and an armature having several independent coils coupled in the motor-circuit, a power-transmitting connection between the armature of the counter-electromotive-force generator, and one of the axles of the car to control the speed of rotation of the armature, and a hand-switch for coupling the coils of the armature in series or parallel to vary the counter electromotive force interposed in the motor-circuit.

20. In an electric railway, a car provided with one or more electric motors, a motor-circuit connecting the motors with the source of electric energy, a counter-electromotive-force generator consisting of field-magnets and an armature having several independent coils coupled in the motor-circuit, a power-transmitting connection between the armature of the counter-electromotive-force generator and one of the axles of the car to control the speed of rotation of the armature, one or more resistances, and a hand-switch for coupling the coils of the armature in series or parallel and successively introducing and cutting out the resistances with each change of the connections of the armature-coils when varying the counter electromotive force interposed in the motor-circuit.

21. In an electric railway, a car provided with one or more electric motors, a motor-circuit connecting the motors with the source of electric energy, a counter-electromotive-force generator consisting of the field-magnets and an armature having several independent coils coupled in the motor-circuit, a power-transmitting connection between the armature of the counter-electromotive-force generator and one of the axles of the car to control the speed of rotation of the armature, one or more resistances, and a hand-switch for coupling the coils of the armature in series or parallel and successively introducing and cutting out the resistances with each change of the connections of the armature-coils, and finally to cut out the armature-coils and complete the motor-circuit through the resistances to vary the counter electromotive force interposed in the motor-circuit.

22. In an electric railway, a car provided with one or more electric motors, a motor-circuit connecting the motors with the source of electric energy, a counter-electromotive-force generator consisting of the field-magnets and an armature having several independent coils coupled in the motor-circuit, a power-transmitting connection between the armature of the counter-electromotive-force generator and one of the axles of the car to control the speed of rotation of the armature, one or more resistances, a hand-switch for coupling the axles of the armature in series or parallel and successively introducing and cutting out the resistances with each change of the connections of the armature-coils to vary the counter electromotive force interposed in the motor-circuit, and means for varying the strength of the field-magnets of the counter-electromotive-force generator.

23. The combination of a motor-circuit, an electric motor receiving current therefrom, and means interposed in the motor-circuit for controlling the currents supplied to the motor consisting of a counter-electromotive-force generator comprising a revolving armature moving in a magnetic field, hand-controlled devices for governing the speed of rotation of the armature in the magnetic field, and hand-controlled devices independent of the speed of the armature for varying the counter electromotive force thereof interposed in the motor-circuit.

24. The combination of a motor-circuit, an electric motor receiving current therefrom, and means interposed in the motor-circuit for controlling the currents supplied to the motor consisting of a counter-electromotive-force generator comprising a revolving armature moving in a magnetic field, hand-controlled devices for governing the speed of rotation of the armature in the magnetic field, hand-controlled devices independent of the speed of the armature for varying the counter electromotive force thereof interposed in the motor-circuit, and ohmic resistances arranged in series with the armature of the counter-electromotive-force generator adapted to be inserted in and removed from the motor-circuit with each material variation in the counter electromotive force of the armature of the generator.

25. The combination of a motor-circuit, an electric motor receiving current therefrom, and means interposed in the motor-circuit for controlling the currents supplied to the motors consisting of a counter-electromotive-force generator comprising a revolving armature moving in a magnetic field, hand-controlled devices for governing the speed of rotation of the armature in the magnetic field, hand-controlled devices independent of the speed of the armature for varying the counter electromotive force thereof which is interposed in the motor-circuit, and means for varying the strength of the magnetic field in which the armature of the counter-electromotive-force generator rotates to also vary the counter electromotive force of the generator.

26. The combination of one or more cars, electric motors on said cars to propel them, electric circuits connecting with the several motors on the cars and leading to a source of energy, a counter-electromotive-force generator arranged in the electric circuits for generating a counter electromotive force opposed to the electromotive force of the source of energy, a hand-controlled device for varying the counter electromotive force of the generator, and means for cutting the motors out of circuit with the source of energy and completing a closed circuit through the motors and counter-electromotive-force generator.

27. The combination of one or more cars, electric motors on said cars to propel them, electric circuits connecting with the several motors on the cars and leading to a source of energy, a counter-electromotive-force generator arranged in the electric circuits for generating a counter electromotive force opposed to the electromotive force of the source of energy, a hand-controlled device for varying the counter electromotive force of the generator, means for reversing the polarity of one of the elements (field-magnets or armature) of the motors, and means for cutting the motors out of circuit with the source of energy and completing a closed circuit through the motors and counter-electromotive-force generator.

28. The combination of one or more cars, electric motors on said cars to propel them, electric circuits connecting with the several motors on the cars and leading to a source of energy, a counter-electromotive-force generator arranged in the electric circuits for generating a counter electromotive force opposed to the electromotive force of the source of energy, a hand-controlled device for varying the counter electromotive force of the generator, means for reversing the polarity of one of the elements (field-magnets or armature)

of the motors, means to maintain a separately-excited field for the counter-electromotive-force generator, and means to reverse the polarity of the field of said generator relatively to the armature.

29. The combination of one or more cars, electric motors on said cars to propel them, electric circuits connecting with the several motors on the cars and leading to a source of energy, a counter-electromotive-force generator arranged in the electric circuits for generating a counter electromotive force opposed to the electromotive force of the source of energy, a hand-controlled device for varying the counter electromotive force of the generator, means for reversing the polarity of one of the elements (field-magnets or armature) of the motors, means for maintaining a magnetic field for the counter-electromotive-force generator, and hand-controlled devices for varying the said field independent of the current generated in the motors when acting as generators.

30. The combination of one or more cars, electric motors on said cars to propel them, electric circuits connecting with the several motors on the cars and leading to a source of energy, a counter-electromotive-force generator arranged in the electric circuits for generating a counter electromotive force opposed to the electromotive force of the source of energy, a hand-controlled device for varying the counter electromotive force of the generator, and means for cutting the motors out of circuit with the source of energy and completing a closed circuit through the motors and counter-electromotive-force generator and finally short-circuiting the motors when acting as the generators around said counter-electromotive-force generator.

31. The combination of one or more cars, electric motors on said cars to propel them, electric circuits connecting with the several motors on the cars and leading to a source of energy, a counter-electromotive-force generator arranged in the electric circuits for generating a counter electromotive force opposed to the electromotive force of the source of energy, a hand-controlled device for varying the counter electromotive force of the generator, means for cutting the motors out of circuit with the source of energy and completing a closed circuit through the motors and counter-electromotive-force generator and finally short-circuiting the motors when acting as the generators around said counter-electromotive-force generator, and means to insert and remove ohmic resistances in the circuit of the short-circuited motors.

32. The combination of one or more cars, electric motors on said cars to propel them, electric circuits connecting with the several motors on the cars and leading to a source of energy, a counter-electromotive-force generator arranged in the electric circuits for generating a counter electromotive force opposed to the electromotive force of the source of energy, a hand-controlled device for varying the counter electromotive force of the generator, means for reversing the polarity of one of the elements (field-magnets or armature) of the motors, means for cutting the motors out of circuit with the source of energy and completing a closed circuit through the motors and counter-electromotive-force generator, and means to insert and remove ohmic resistances in the circuit of the short-circuited motors.

33. The combination of one or more cars, electric motors on said cars to propel them, electric circuits connecting with the several motors on the cars and leading to a source of energy, a counter-electromotive-force generator arranged in the electric circuits for generating a counter electromotive force opposed to the electromotive force of the source of energy, a hand-controlled device for varying the counter electromotive force of the generator, means for maintaining the field-magnets in the motors in electric connection with the source of energy, and means for short-circuiting the armatures of the motors through the counter-electromotive-force generator.

34. The combination of one or more cars, electric motors on said cars to propel them, electric circuits connecting with the several motors on the cars and leading to a source of energy, a counter-electromotive-force generator arranged in the electric circuits for generating a counter electromotive force opposed to the electromotive force of the source of energy, a hand-controlled device for varying the counter electromotive force of the generator, means for maintaining the field-magnets in the motors in electric connection with the source of energy, means for short-circuiting the armatures of the motors through the counter-electromotive-force generator, and means for reversing the polarity of one of the elements (armatures or fields) of the motors.

35. The combination of one or more cars, electric motors on said cars to propel them, electric circuits connecting with the several motors on the cars and leading to a source of energy, a counter-electromotive-force generator arranged in the electric circuits for generating a counter electromotive force opposed to the electromotive force of the source of energy, a hand-controlled device for varying the counter electromotive force of the generator, means for maintaining the field-magnets of the motors in electric connection with the source of energy, and means for short-circuiting the armatures of the motors through the counter-electromotive-force generator and varying the electromotive force produced by the generator.

36. The combination of one or more cars, electric motors on said cars to propel them, electric circuits connecting with the several motors on the cars and leading to a source of energy, a counter-electromotive-force generator arranged in the electric circuits for generating a counter electromotive force opposed to the electromotive force of the source of energy, a hand-controlled device for varying the counter electromotive force of the generator, means for maintaining the field-magnets of the motors in electric connection with the source of energy, means for short-circuiting the armatures of the motors through the counter-electromotive-force generator and varying the electromotive force produced by the generator and simultaneously with said operation inserting variable ohmic resistances with each change of the electromotive force of the generators.

37. The combination of one or more cars, electric motors on said cars to propel them, electric circuits connecting with the several motors on the cars and leading to a source of energy, a counter-electromotive-force generator arranged in the electric circuits for generating a counter electromotive force opposed to the electromotive force of the source of energy, a hand-controlled device for varying the counter electromotive force of the generator, means for maintaining the field-magnets of the motors in electric connection with the source of energy, means for short-circuiting the armatures of the motors through the counter-electromotive-force generator, ohmic resistances, and means for closing the armature-circuits of the motors when acting as generators through the ohmic resistances and cutting the counter-electromotive-force generator out of circuit.

38. The combination of one or more cars, electric motors on said cars to propel them, electric circuits connecting with the several motors on the cars and leading to a source of energy, a counter-electromotive-force generator arranged in the electric circuits for generating a counter electromotive force opposed to the electromotive force of the source of energy, a hand-controlled device for varying the counter electromotive force of the generator, means for maintaining the field-magnets of the motors in electric connection with the source of energy, ohmic resistances, and means for short-circuiting the armatures of the motors through the counter-electromotive-force generator and through the ohmic resistances and subsequently reducing the said ohmic resistances in circuit.

39. The combination of one or more cars, electric motors on said cars to propel them, electric circuits connecting with the several motors on the cars and leading to a source of energy, a counter-electromotive-force generator arranged in the electric circuits for generating a counter electromotive force opposed to the electromotive force of the source of energy, a hand-controlled device for varying the counter electromotive force of the generator, means for maintaining the field-magnets of the motors in electric connection with the source of energy, means for short-circuiting the armatures of the motors through the counter-electromotive-force generator, and power-transmitting connections between the counter-electromotive-force generator and the axle whereby it acts as a motor to drive the car or train while generating the counter electromotive force for regulating the speed.

40. The combination of one or more cars, electric motors on said cars to propel them, electric circuits connecting with the several motors on the cars and leading to a source of energy, a counter-electromotive-force generator arranged in the electric circuits for generating a counter electromotive force opposed to the electromotive force of the source of energy, a hand-controlled device for varying the counter electromotive force of the generator, means for maintaining the field-magnets of the motors in electric connection with the source of energy, means for short-circuiting the armatures of the motors through the counter-electromotive-force generator, means for reversing the polarity of one of the elements (armatures or fields) of the motors, and power-transmitting connections between the counter-electromotive-force generator and the axle whereby it acts as a motor to drive the car or train while generating the counter electromotive force for regulating purposes.

41. A controller device for electric motors consisting of a counter-electromotive-force generator, a series of resistances, and a hand-switch device for alternately varying the counter electromotive force of the generator and inserting resistances and successively removing the resistances while maintaining the counter electromotive force.

42. A controller device for electric motors consisting of a counter-electromotive-force generator, a series of resistances, and a hand-switch device for varying the counter electromotive force of the generator and inserting and successively removing the resistances after each change in the counter electromotive force and while maintaining it temporarily constant.

43. A controller device for electric motors consisting of a counter-electromotive-force generator, a series of resistances, a hand-switch device for varying the counter electromotive force of the generator and inserting and successively removing the resistances, and means under the control of the hand-switch for finally short-circuiting the counter-electromotive-force generator while the resistances are maintained in circuit whereby the generator is put out of operative circuit.

44. A controller device for electric motors consisting of a counter-electromotive-force generator, a series of resistances, and a hand-switch device for varying the counter electromotive force of the generator and inserting and successively removing the resistances and further completing a circuit through the resistances around the counter-electromotive-force generator and finally successively short-circuiting the resistances.

45. In a regulator for electric motors, the combination of a series of magnetic fields, a series of moving electric conductors traversing said fields and in which are generated electromotive forces, and a hand-switch for coupling the terminals of said electric conductors so as to connect the conductors in series, series multiple or parallel whereby the electromotive force may be varied by hand regulation.

46. In a regulator for electric motors, the combination of a series of magnetic fields, a series of moving electric conductors traversing said fields and in which are generated electromotive forces, and a hand-switch for coupling the terminals of said electric conductors so as to arrange the conductors in series, series multiple or parallel whereby the electromotive force may be varied by hand regulation, a series of resistances, and means governed by the hand-switch for inserting and successively cutting out said resistances when the conductors moving in the several magnetic fields are connected in series, series multiple or parallel.

47. In a regulator for electric motors, the combination of a series of magnetic fields, a series of moving electric conductors traversing said fields and in which are generated electromotive forces, and a hand-switch for coupling the terminals of said electric circuits so as to connect the conductors in series, series multiple or parallel whereby the electromotive force may be varied by hand regulation, a series of resistances, and means governed by the hand-switch for inserting and successively cutting out said resistances when the conductors moving in the several magnetic fields are connected in series, series multiple or parallel and also insert and remove successively said resistances simultaneously with the insertion of a short circuit about the said conductors.

48. In a regulator for electric motors, the combination of a magnetic field, moving conductors therein for producing an electromotive force, a series of resistances, and a hand-switch to couple said resistances with the moving conductors, then successively cut the resistances out of circuit while maintaining the moving conductors in circuit, then insert the resistances again and cut the moving conductors out of circuit and finally to successively cut the resistances out of operative circuit.

49. In a regulator for electric motors a series of magnetic fields, a series of separate armature-coils moving in said magnetic fields and electrically communicating with fixed terminals, a single shaft carrying all of said separate armature-coils so that they all move with the same speeds, a series of resistances, and a hand-switch for coupling the several armature-coils in series or parallel and inserting and removing the resistances with each of said changes.

50. In a regulator for electric motors a series of magnetic fields, a series of separate armature-coils moving in said magnetic fields and electrically communicating with fixed contacts, a single shaft carrying all of said separate armature-coils so that they all move with the same speeds, a series of resistances, and a hand-switch for coupling the several armature-coils in series, series multiple or parallel and inserting and removing the resistances with each of said changes and finally cutting out the coils of the armature and inserting the resistances and subsequently successively cutting out said resistances.

51. The combination of a series of motors having the field-magnet coils in series with the armature, a source of electric energy, a motor-circuit for supplying electric current to said motors and causing it to first pass through all of the field-magnets and then through all of the armatures or vice versa, a suitable regulator for simultaneously controlling the current delivered to both the field-magnets and armatures of all of the motors, and hand-controlled devices for shunting more or less current around the field-magnets of all of the motors and supplying it to the armatures together with the current passing through the field-magnets for increasing the current delivered to the armatures over that which would be permitted to pass through the field-magnets and while retaining the motors as series motors.

52. The combination of one or more motors, a source of electric energy, a motor-circuit for supplying electric current to said motors, a suitable regulator for controlling the current delivered to the motors, and additional hand-controlled devices for increasing the current flowing in the field-magnets relatively to the armature.

53. The herein-described method of regulating an electrically-driven car or train which consists in supplying to the motor or motors a current of constant potential, interposing a variable counter electromotive force to the current supplied to the motors, varying the counter electromotive force by hand, and interposing variable ohmic resistances to the current supplied to the motors to vary the said current intermediate of material changes in the counter electromotive force.

54. The herein-described method of regulating an electrically-driven car or train which consists in supplying to the motor or motors a current of constant potential, interposing a variable counter electromotive force to the current supplied to the motors, varying the counter electromotive force by hand regulation, interposing variable ohmic resistances to the current supplied to the motors to vary the said current intermediate of material changes in the counter electromotive force 55. The herein-described method of regulating an electrically-driven car or train which consists in supplying to the motor or motors a current of constant potential, interposing a variable counter electromotive force to the current supplied to the motors, varying the counter electromotive force by hand regulation, interposing variable ohmic resistances in series with the motors to vary the current supplied to the motors intermediate of material changes made in the counter electromotive force, reversing the current in one of the elements (field-magnets or armatures) of the motors, and cutting said motors out of operative circuit with the source of energy and short-circuiting them through the ohmic resistances whereby said motors act as generators and their current regulated.

56. The herein-described method of regulating an electrically-driven car or train which consists in supplying to the motor or motors a current of constant potential, interposing a variable counter electromotive force in the current supplied to the motors, varying the counter electromotive force by hand regulation, interposing variable ohmic resistances in series with the motors to vary the current supplied to the motors intermediate of material changes made in the counter electromotive force, reversing the current in one of the elements (field-magnets or armatures) of the motors, cutting said motors out of operative circuit with the source of energy and short-circuiting the motors through the ohmic resistances whereby said motors act as generators and their current regulated, and transmitting the power produced by the production of the counter electromotive force to the axle on the car or train.

57. The herein-described method of regulating an electrically-driven car or train which consists in supplying to the motor or motors a current of constant potential, interposing a variable counter electromotive force in series with the motors, varying by hand regulation the counter electromotive force, interposing variable ohmic resistances in series with the motors and to vary the current supplied to the motors intermediate of material changes in the counter electromotive force, ultimately annulling the counter electromotive force while maintaining in the motor-circuit the ohmic resistance for regulation, and transmitting the power produced by the generation of the counter electromotive force to the axle on the car or train.

58. The herein-described method of regulating an electric current which consists in passing a current of constant potential through an electric circuit containing translating devices, producing by induction a series of separate counter electromotive forces, coupling said counter electromotive forces in series or parallel by hand-controlled devices, impressing the sum of said counter electromotive forces so coupled upon the electromotive force flowing in the line-circuit, and varying the current thus permitted to flow by interposing variable ohmic resistances in the circuit.

59. The herein-described method of regulating an electric current which consists in passing a current of constant potential through an electric circuit containing translating devices, producing by induction a series of separate counter electromotive forces, coupling said counter electromotive forces in series or parallel by hand-controlled devices, impressing the sum of said counter electromotive forces so coupled upon the electromotive force flowing in the line-circuit, varying the current thus permitted to flow by interposing variable ohmic resistances in the circuit, and ultimately annulling the counter electromotive forces while maintaining the ohmic resistance in opposition to the current in the line.

60. The herein-described method of regulating the current in a circuit including translating devices which consist in maintaining a magnetic field of force, generating by induction a series of counter electromotive forces, suitably grouping said counter electromotive forces to vary their sum total, opposing them to the electromotive force of the current in the line, and varying the said counter electromotive forces by varying the magnetic field of force.

61. The herein-described method of regulating the current in a circuit including translating devices which consist in maintaining a magnetic field of force, generating by induction a series of counter electromotive forces, suitably grouping and opposing them to the electromotive force of the current in the line, varying the said counter electromotive forces by varying the magnetic field of force, and interposing in series with said counter electromotive forces a variable ohmic resistance.

62. In a counter-electromotive-force regulator for controlling a current delivered to a motor or other translating devices, consisting of multiple field-magnets having pole-pieces arranged alternately of opposite polarity, a revolving armature adapted to said field-magnets and provided with a series of armature-coils, terminal circuits, and a hand-controlled switch for coupling up the several coils of the armature in series or parallel with the terminal circuits to vary the counter electromotive force produced.

63. A controller device for electric motors consisting of a motor-circuit, a generator for generating a variable counter electromotive force, a series of resistances, and means for introducing the generator into the motor-circuit to oppose its variable counter electromotive force to the electromotive force of the current in the motor-circuit, and while maintaining said generator in the motor-circuit to cut the resistances into or out of the motor-circuit to assist the generator in regulating the flow of current to the motors.

64. The combination of a motor-circuit, one or more motors supplied with current thereby, a counter-electromotive-force regulator in the motor-circuit, and a hand-switch for varying the counter electromotive force and also cutting it out of circuit by completing the motor-circuit around the counter-electromotive-force generator through an ohmic resistance.

In testimony of which invention I hereunto set my hand.

R. M. HUNTER.

Witnesses:
J. W. KENWORTHY,
WM. L. EVANS.